Jan. 28, 1964 L. COLADONATO 3,119,589
DEER FEET MOUNTS
Filed Sept. 11, 1961 2 Sheets-Sheet 1

INVENTOR
Leo Coladonato
BY
ATTORNEY

Jan. 28, 1964   L. COLADONATO   3,119,589
DEER FEET MOUNTS
Filed Sept. 11, 1961   2 Sheets-Sheet 2
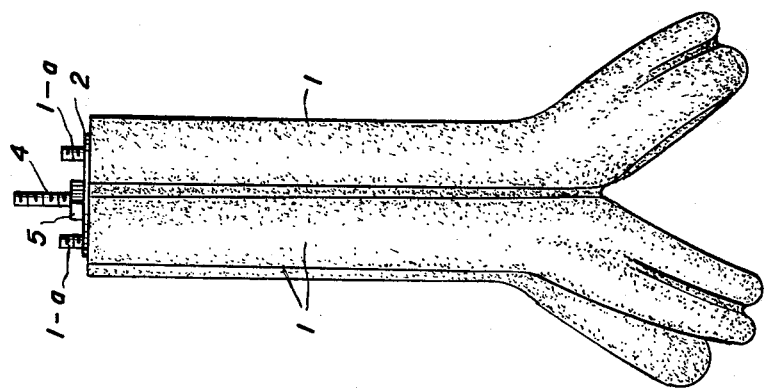
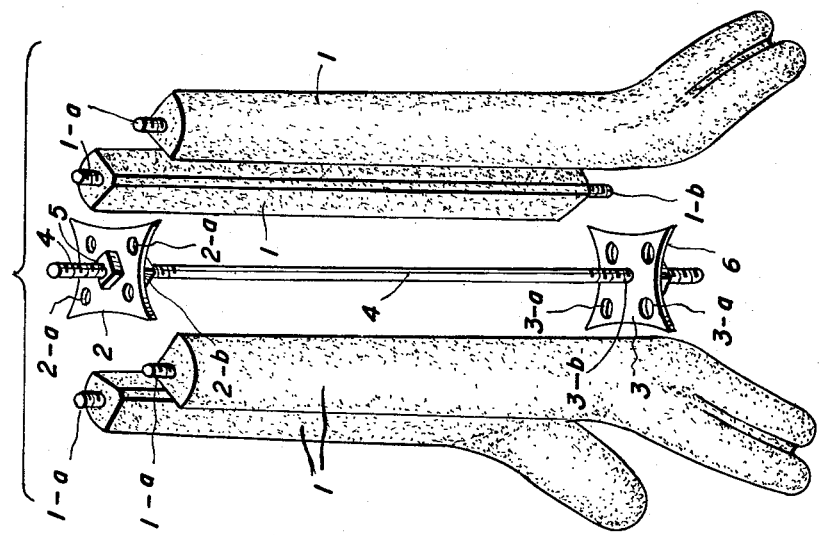
INVENTOR
Leo Coladonato
BY *Ogle R. Singleton*
ATTORNEY

United States Patent Office 3,119,589
Patented Jan. 28, 1964

3,119,589
DEER FEET MOUNTS
Leo Coladonato, 803 Carson St., Hazleton, Pa.
Filed Sept. 11, 1961, Ser. No. 137,232
1 Claim. (Cl. 248—159)

My invention consists in a new and useful improvement in deer feet mounts and is designed more particularly to provide a mount for four deer feet to form a lamp base. The peculiarly novel feature of my improved mount is the combination of four suitable forms for the feet, respectively, a pair of washers on which the forms are mounted, and a connector on which the washers are slidably mounted. The parts are so designed and related that, when the forms carrying the feet have been mounted on the washers on the connector, nuts threaded on the connector function to slide the washers on the connector to securely clamp the forms to hold the feet in correct alignment.

While I have illustrated in the drawings and hereinafter fully describe one specific embodiment of my invention, it is to be distinctly understood that I do not consider my invention to be limited to said embodiment but refer for its scope to the claim appended hereto.

In the drawings:

FIG. 2 is an exploded perspective of the parts of the mount.

FIG. 3 is a side elevation of the assembled parts.

Figure 1:
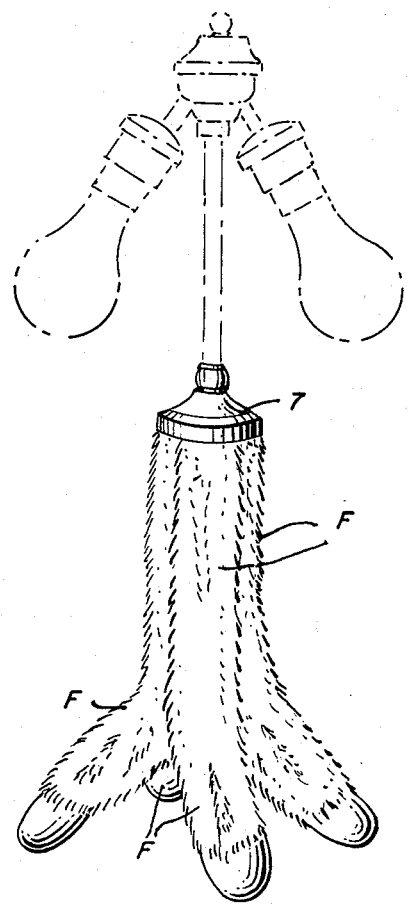
FIG. 1 is a perspective of my novel mount.

As shown in the drawings, my device is designed for mounting four deer feet F to serve as a lamp base.

My mount comprises four forms 1, a pair of star washers 2 and 3, a tubular connector 4, a pair of nuts 5 and 6, and a ferrule 7. The forms 1 of suitable material, such as expanded polystyrene, are so molded in configuration and dimensions as to have snugly mounted, on each form 1, a deer foot F. Each form 1 has a molded-in rod having its upper end 1–a protruding from the top of the form 1 and its lower end 1–b protruding from the bottom of the form 1. The upper washer 2 has four symmetrically disposed holes 2–a to receive therethrough said ends 1–a, respectively, and a central orifice 2–b to receive therethrough the connector 4. The lower washer 3 has four symmetrically disposed holes 3–a to receive therethrough said ends 1–b, respectively, and a central orifice 3–b to receive therethrough the connector 4.

When the forms 1 are thus mounted on the washers 2 and 3 mounted on the connector 4, the nuts 5 and 6 are set up on the threaded portions of the connector 4, thereby bearing downwardly on the upper washer 2 and upwardly on the lower washer 3, to firmly clamp the forms 1 in proper relation.

It is obvious that, when the forms 1 have been thus positioned, the feet F mounted on the forms 1 will assume the positions illustrated in FIG. 1.

A suitable ferrule 7 can be applied at the upper end of connector 4 to cover the upper ends of the feet F, and suitable fixtures and bulbs (shown in dotted lines) can be mounted and connected with electric wiring disposed through the connector 4.

Having described my invention, what I claim is:

In a lamp base, the combination of four molded legs, each of which has four sides, one of which sides is convex, two of which sides are plane and converge from said convex side, and the remaining side is plane and is disposed between said two converging sides, said legs being so dimensioned and related as to form a substantially cylindrical stem with a central bore therethrough; a vertical rod molded in each of said legs and having two portions protruding from the top and the bottom of the leg, respectively, to provide a pair of pins on the upper and lower ends of said leg, respectively; a hollow, exteriorly threaded conduit received in said central bore; a star-washer slidably mounted on said conduit and having four symmetrically disposed holes through which are received the upper pins of said legs; a second star-washer slidably mounted on said conduit and having four symmetrically disposed holes through which are received the lower pins of said legs; a nut threaded on said conduit and bearing downwardly against said first star-washer; a second nut threaded on said conduit and bearing upwardly against said second star-washer; and a ferrule having a skirt enclosing the upper end of said legs, and an upper end encircling said conduit.

References Cited in the file of this patent

UNITED STATES PATENTS

| | | |
|---|---|---|
| 469,358 | Nesson | Feb. 23, 1892 |
| 1,694,617 | Brown | Dec. 11, 1928 |
| 2,204,362 | Illian | June 11, 1940 |
| 2,342,233 | Wood | Feb. 22, 1944 |